United States Patent
Purushothaman et al.

(10) Patent No.: US 10,021,013 B2
(45) Date of Patent: Jul. 10, 2018

(54) OPTIMIZING THE MONITORING OF AN ENTERPRISE SERVER ENVIRONMENT

(71) Applicant: BANK OF AMERICA CORPORATION, Charlotte, NC (US)

(72) Inventors: Sasidhar Purushothaman, Hyderabad (IN); Sathis Kumar Karuppannan, Chennai (IN); Mabel Honey Lodge, Hyderabad (IN); Kamaluddin Khan, Mumbai (IN); Kaleeswaran Veluchamy, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 367 days.

(21) Appl. No.: 14/942,628

(22) Filed: Nov. 16, 2015

(65) Prior Publication Data

US 2017/0141993 A1  May 18, 2017

(51) Int. Cl.
*G06F 15/173* (2006.01)
*H04L 12/26* (2006.01)
*H04L 12/24* (2006.01)

(52) U.S. Cl.
CPC .......... *H04L 43/16* (2013.01); *H04L 41/0654* (2013.01); *H04L 41/0681* (2013.01); *H04L 43/0817* (2013.01)

(58) Field of Classification Search
CPC . H04L 43/16; H04L 43/0817; H04L 41/0654; H04L 41/0681

USPC ........................................................ 709/224
See application file for complete search history.

(56) References Cited

U.S. PATENT DOCUMENTS

| | | |
|---|---|---|
| 7,249,179 B1 | 7/2007 | Romero et al. |
| 7,761,548 B2 * | 7/2010 | Snyder .................. H04L 41/145 702/182 |
| 8,316,101 B2 | 11/2012 | Ammerlaan et al. |
| 8,505,018 B1 | 8/2013 | Morgan et al. |
| 9,081,624 B2 | 7/2015 | Liu et al. |
| 2007/0260732 A1 * | 11/2007 | Koretz ................ H04L 67/1095 709/226 |
| 2008/0059972 A1 * | 3/2008 | Ding ...................... G06F 9/505 718/105 |

* cited by examiner

*Primary Examiner* — Tauqir Hussain
(74) *Attorney, Agent, or Firm* — Michael A. Springs; Moore & Van Allen PLLC; James C. Edwards (57) ABSTRACT

The present invention provides for identifying the core server parameters to be monitored enterprise-wide and the baseline thresholds/limits for such parameters. The thresholds are dynamically optimized as the server environment evolves over time based on the composite historical performance of the servers in the enterprise. Moreover, each parameter's threshold is optimized in comparison to the thresholds of other core parameters that impact that specific parameter. In the event that the monitoring results in a threshold being met or exceeded alerts may be generated to designated personnel and appropriate corrective action taken.

15 Claims, 3 Drawing Sheets

OPTIMIZING THE MONITORING OF AN ENTERPRISE SERVER ENVIRONMENT

FIELD

In general, embodiments of the invention relate to computing networks and, more particularly, systems, method and optimizing the monitoring of an enterprise-wide server environment.

BACKGROUND

Monitoring servers in an enterprise environment can be a daunting task due to the sheer volume of servers deployed throughout an enterprise. For example, it is not uncommon for a large enterprise to deploy hundreds of thousands of servers, all of which require some level of monitoring. In addition, the servers may differ based on Operating Systems (OSs) and the role they are employed for within the enterprise (e.g., test/non-production, production and the like) and the category of applications hosted thereon. Monitoring of servers entails tracking the performance of key/core parameters associated with the server to identify problems that are critical, or are soon to be critical and, in response to identifying the problems, notifying the proper personnel so that corrective actions can be taken to resolve the problem.

Currently most monitoring of servers is done on an individualized basis, meaning the entity responsible for the server, or the entity responsible for the applications running on the server not only define which parameters should be monitored, but also define the threshold values for monitoring (i.e., the limits which prompt actions, such as alerts or the like). Such individualized decisions on which parameters should be monitored and at what threshold/level tend to be arbitrary and subjective.

For example, if a responsible entity defines an allowable Central Processing Unit (CPU) usage threshold at 80% for a specified server and, after a period of time (e.g., six months or the like) the computational demands on the CPU increase, numerous false alerts are likely to be generated when the CPU usage exceeds the subjective 80% usage threshold. However, in addressing the false alert issue, if the responsible entity arbitrarily adjusts the threshold to 95% prompting fewer alerts from being generated, underlying problems (e.g., an application using a high volume of CPU cycles) may go undetected.

Therefore, a need exists to develop systems, apparatus, computer program products, methods and the like that provide a unitary means of consistently monitoring all of the servers with an enterprise environment. The desired approach should eliminate the individualized approach to monitoring servers, whereby each server has its own specified server parameters being monitored and its own threshold values for the specified server parameters. Moreover, the desired systems, apparatus, computer program products, and methods should provide a meaningful and optimal way to monitor such that critical problems apparent in a server are identified in a timely manner so that appropriate corrective action can ensue. In this regard, the desired approach should result in a self-evolving means that identifies the most optimal threshold values for crucial/core performance parameters.

SUMMARY OF THE INVENTION

The following presents a simplified summary of one or more embodiments in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

Embodiments of the present invention address the above needs and/or achieve other advantages by providing apparatus, systems, computer program products, methods or the like provide for identifying the most vital or core server parameters to be monitored enterprise-wide and calculating the baseline thresholds/limits for such parameters. In this regards, most, if not all of the servers in the enterprise are monitored using the same core parameters and the same thresholds. Such consistently eliminates the subjectivity in allowing parameters to be chosen and thresholds assigned on a per-server basis based on server type, operating system and/or applications hosted thereon.

Over time as the server environment evolves the thresholds of the core parameters are optimized, or otherwise adjusted, based on the composite historical performance of the servers in the enterprise. In addition, each core parameter's threshold is optimized in comparison to the thresholds of other core parameters that impact that specific parameter. As such, as a result of the dynamic optimization of the present invention each parameter's threshold is proportional to the thresholds of the other core parameters impacted by that parameter. In the event that the monitoring results in a threshold being met or exceeded alerts may be generated to designated personnel and appropriate corrective action taken. As a result of the unique means for optimizing server parameter thresholds herein discussed, the present invention provides for a stable server environment across the entirety of an enterprise, such that, each server in the enterprise is capable of hosting relevant applications.

A system for optimizing monitoring of servers in an enterprise environment defines first embodiments of the invention. The system includes a plurality of server devices operable throughout an enterprise-wide computing network environment. The system additionally includes an apparatus, which may comprise one or more computing devices, including a computing platform having a memory and at least processor device in communication with the memory. In addition, the system includes a server monitoring module that is stored in the memory and executable by the processor device. The monitoring module is configured to monitor a predetermined set of core server parameters on each of the plurality of servers for compliance to an associated threshold value. In this regard all of the servers are monitored for the same core parameters according to the same threshold limits. Additionally, the system includes server monitoring optimization module that is stored in computing memory and executable by a processor device. The optimization module is configured to logically identify the core server parameters and corresponding threshold values for each of the core server parameters. The threshold values are determined based at least in part on composite historical performance data associated with each of the plurality of servers. The optimization module is further configured optimize, over time while monitoring, the threshold values to take into account changes in conditions experienced by the plurality of servers. The thresholds are optimized based at least on (1) composite historical performance data associated with each of the plurality of servers, and (2) a relevant importance of each of the core server parameters in comparison to a core server parameter undergoing threshold optimization.

According to specific embodiments of the system, the threshold value defines a limit for a core server parameter, wherein reaching or exceeding the limit indicates that the server is nearing, but has yet to reach, an unstable state.

In other specific embodiments of the system, the server monitoring module is further configured to generate and initiate communication of an alert in response to monitoring determining that one or more of the core server parameters meet or exceed the associated threshold value.

In still further specific embodiments of the system, the server monitoring optimization module is further configured to optimize the threshold values on-demand. While in other related embodiments of the system, the server monitoring optimization module is further configured to optimize the threshold values on a continuous dynamic basis.

Moreover, in other specific embodiments of the system, the threshold optimizing module is further configured to optimize, over time, the threshold values to take into account changes in the conditions experienced by the plurality of servers, such that, the thresholds are optimized in proportion to the relevant importance of other server parameters impacting the server parameter undergoing threshold optimization.

A computer-implemented method for optimizing monitoring of servers in an enterprise environment defines second embodiments of the invention. The method includes identifying core server parameters applicable to a plurality of servers within an enterprise-wide computing network and determining threshold values for each of the core server parameters. The threshold values are determined based at least in part on composite historical performance data associated with each of the plurality of servers. Additionally, the method includes monitoring the plurality of servers for compliance to the threshold values associated with the core server parameters and optimizing, over time while monitoring, the threshold values to take into account changes in conditions experienced by the plurality of servers. The threshold values are optimized based at least on (1) composite historical performance data associated with each of the plurality of servers, and (2) a relevant importance of each of the core server parameters in comparison to a core server parameter undergoing threshold optimization.

In specific embodiments of the method, the threshold value defines a limit for a core server parameter, wherein reaching or exceeding the limit indicates that the server is nearing, but has yet to reach, an unstable state.

In other specific embodiments the method includes generating and initiating communication of an alert in response to determining that one or more of the core server parameters meet or exceed the associated threshold value.

In still further specific embodiments of the method optimizing further comprises optimizing, by the computing device processor, on-demand, the threshold values. While in other related embodiments of the method, optimizing further comprises dynamically optimizing, by the computing device processor, over-time, the threshold values, such that the threshold values are continuously assessed to take into account real-time changes in conditions experienced by the plurality of servers.

Moreover, in other specific embodiments of the method, optimizing further comprises optimizing, over-time, the threshold values, wherein the thresholds are optimized in proportion to the relevant importance of other server parameters impacting the server parameter undergoing threshold optimization.

A computer program product including a non-transitory computer-readable medium defines third embodiments of the invention. The computer-readable medium includes a first set of codes for causing a computer to identify core server parameters applicable to a plurality of servers within an enterprise-wide computing network and a second set of codes for causing a computer to determine threshold values for each of the core server parameters. The threshold values are determined based at least in part on composite historical performance data associated with each of the plurality of servers. The computer-readable medium includes a third set of codes for causing a computer to monitor the plurality of servers for compliance to the threshold values associated with the core server parameters. Additionally, the computer-readable medium includes a fourth set of codes for causing a computer to optimize, over time while monitoring, the threshold values to take into account changes in conditions experienced by the plurality of servers. The threshold values are optimized based at least on (1) composite historical performance data associated with each of the plurality of servers, and (2) a relevant importance of each of the core server parameters in comparison to a core server parameter undergoing threshold optimization.

Thus, systems, apparatus, methods, and computer program products herein described in detail below provide for identifying the core server parameters to be monitored enterprise-wide and the baseline thresholds/limits for such parameters. The thresholds are dynamically optimized as the server environment evolves over time based on the composite historical performance of the servers in the enterprise. Moreover, each parameter's threshold is optimized in comparison to the thresholds of other core parameters that impact that specific parameter, such that each parameter's threshold is proportional to the importance to other parameter's that impact the specified core parameter. In the event that the monitoring results in a threshold being met or exceeded alerts may be generated to designated personnel and appropriate corrective action taken.

To the accomplishment of the foregoing and related ends, the one or more embodiments comprise the features hereinafter fully described and particularly pointed out in the claims. The following description and the annexed drawings set forth in detail certain illustrative features of the one or more embodiments. These features are indicative, however, of but a few of the various ways in which the principles of various embodiments may be employed, and this description is intended to include all such embodiments and their equivalents.

BRIEF DESCRIPTION OF THE DRAWINGS

Having thus described embodiments of the invention in general terms, reference will now be made to the accompanying drawings, which are not necessarily drawn to scale, and wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout. Although some embodiments of the invention described herein are generally described as involving a "financial institution," one of ordinary skill in the art will appreciate that the invention may be utilized by other businesses that take the place of or work in conjunction with financial institutions to perform one or more of the processes or steps described herein as being performed by a financial institution.

As will be appreciated by one of skill in the art in view of this disclosure, the present invention may be embodied as an apparatus (e.g., a system, computer program product, and/or other device), a method, or a combination of the foregoing. Accordingly, embodiments of the present invention may take the form of an entirely hardware embodiment, an entirely software embodiment (including firmware, resident software, micro-code, etc.), or an embodiment combining software and hardware aspects that may generally be referred to herein as a "system." Furthermore, embodiments of the present invention may take the form of a computer program product comprising a computer-usable storage medium having computer-usable program code/computer-readable instructions embodied in the medium.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (e.g., a non-exhaustive list) of the computer-readable medium would include the following: an electrical connection having one or more wires; a tangible medium such as a portable computer diskette, a hard disk, a time-dependent access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention are described below with reference to flowchart illustrations and/or block diagrams of methods or apparatuses (the term "apparatus" including systems and computer program products). It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute by the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

According to embodiments of the invention described herein, various systems, apparatus, methods, and computer program products are herein described for dynamic optimization o servers across an enterprise computing network. Specifically, embodiments of the invention provide for identifying the most vital or core server parameters to be monitored enterprise-wide and calculating the baseline thresholds/limits for such parameters. In this regards, most, if not all, of the servers in the enterprise are monitored using the same core parameters and the same thresholds. Such consistently eliminates the inconsistency and subjectivity in allowing parameters to be chosen and thresholds assigned on a per-server basis based on server type, operating system and/or applications hosted thereon.

Over time as the server environment evolves the thresholds of the core parameters are optimized, or otherwise referred to as adjusted, based on the composite historical performance of the servers in the enterprise. In addition, each core parameter's threshold is optimized in comparison to the thresholds of other core parameters that impact that specific parameter. As such, as a result of the dynamic optimization of the present invention each parameter's threshold is proportional to the importance of the other core parameters impacting that parameter. In the event that the monitoring results in a threshold being met or exceeded alerts may be generated to designated personnel and appropriate corrective action taken. As a result of the unique means for optimizing server parameter thresholds herein discussed, the present invention provides for a stable server environment across the entirety of an enterprise, such that, each server in the enterprise is capable of hosting relevant applications.

Figure 1:
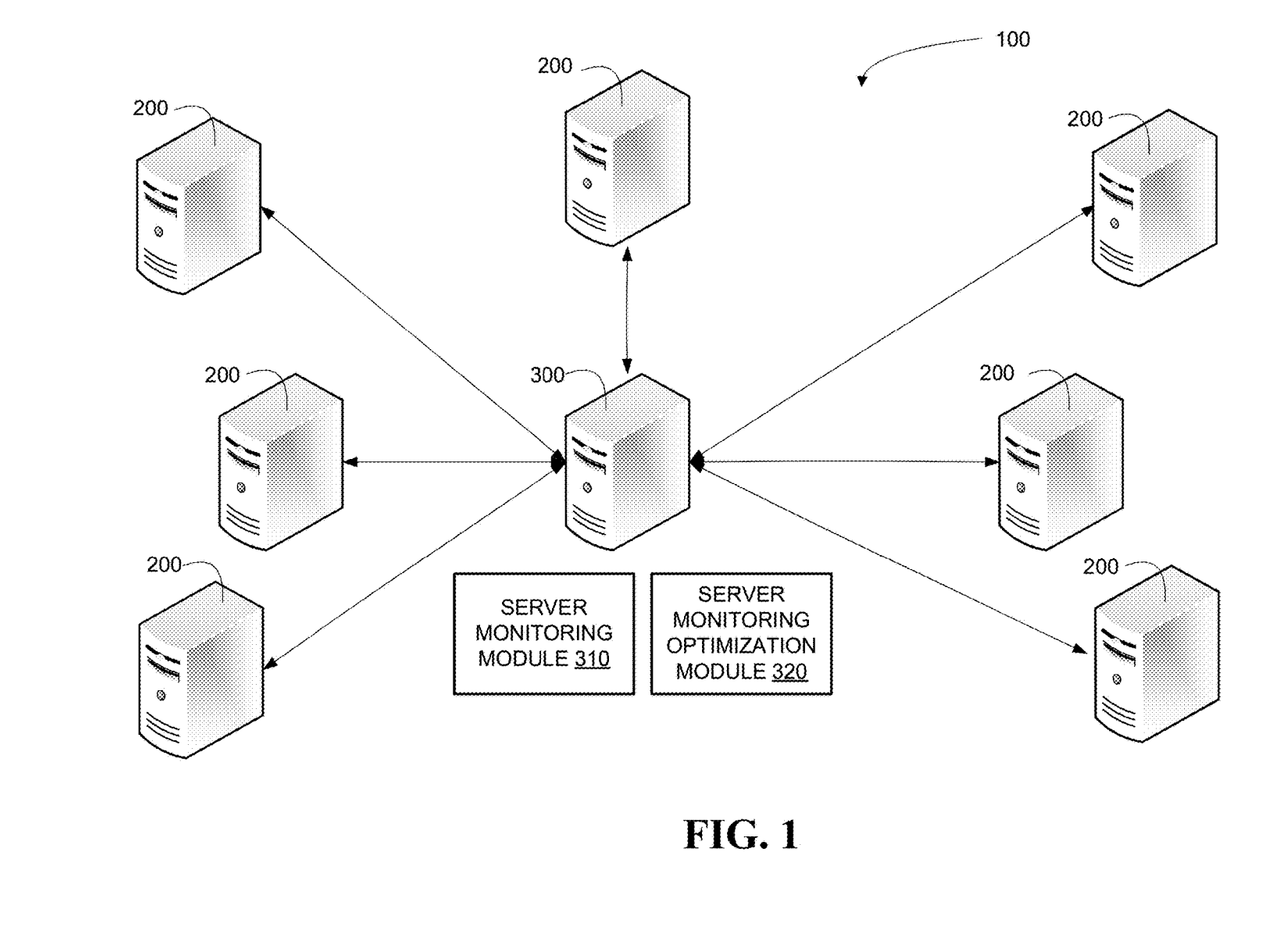
FIG. 1 provides a schematic diagram of a system for dynamic optimization of servers in an enterprise environment, in accordance with embodiments of the present invention.

Referring to FIG. 1, a block diagram is provided of a system 100 configured for optimizing the monitoring of an enterprise-wide server environment; in accordance with embodiments of the present invention. The system includes a plurality of server device 200 disposed throughout an enterprise. In specific embodiments of the invention the server devices 200 may comprise most, and in some embodiments all, of the servers within the enterprise. As such the servers 200 may be disposed in disparate computing domains throughout the enterprise. Moreover, the servers 200 may of a different types; in terms of operating systems (e.g., WINDOWS, MAC OS, LINUX or the like), the category of applications hosted on the servers and/or role that that server plays in the enterprise (e.g., non-production/test, production and the like).

The system addition includes apparatus 300, which may comprise one or more devices, such as one or more servers or the like. The apparatus 300 is in network communication with each of the plurality of servers 200. Further, apparatus 300 hosts server monitoring module 310 and server monitoring optimization module 320. While the disclosure herein describes server monitoring module 310 and server monitoring optimization module 320 as separate modules it should be apparent, and within the boundaries of the invention, that functions described herein as being embodied within server monitoring module 310 and server monitoring optimization module 320 may comprise a single module (e.g., the functionality of server monitoring optimization module 320 may be a sub-module or component of server monitoring module 310 or the like).

Server monitoring module 310 is configured to monitor a predetermined set of core parameters on each of the plurality of servers 200 for compliance to an associated threshold value. In this regard, according to the present invention, the same core parameters are monitored on each of the plurality of servers 200 and the same threshold values are applied to those core parameters on each of the plurality of servers 200. Thus, in those embodiments in which the plurality of servers 200 is defined as most, if not all, of the servers in the enterprise computing network, the entirety of the servers 200 will be monitored according to the same core parameters 314 and the same threshold values 316.

In specific embodiments of the invention, the core parameters may include, but are not limited to, one or more of Central Processing Unit (CPU) usage percentage; memory usage percentage or amount; file system usage/consumption of disk space percentage or amount, processes hosted on the server (i.e., are the processes available, are they running properly, are they occupying proper memory space, are they using proper CPU capacity and the like); logged data (e.g. indication of server issues); and hardware (e.g., warning signals, sensors and the like). It should be noted that the these core parameters are merely exemplary and that the set of core parameters, as identified by the server monitoring optimization module 320 of the present invention, will vary from enterprise-to-enterprise depending on the needs and requirements of the enterprise, the historical stability of the server environment and any other relevant factors.

In the event that a threshold value 316 is reached and/or exceeded during monitoring 312, the server monitoring module 310 is further configured to generate and initiate communication of one or more alerts 318 to predetermined entities within the enterprise as a means of notifying the entity of the non-compliance.

Server monitoring optimization module 320 is configured to initially identify the set of core parameters that need to be monitored and determine the initial baseline threshold values for the identified core parameters. The core parameters and initial baseline threshold values are identified/determined based on composite historical server performance data, as well as, in some embodiments of the invention, heuristic models and any other data that may insure that the core parameter set and the initial baseline threshold values are initially optimal so as to identify problems that may be critical in the server environment. In specific embodiments of the invention the threshold values define the limit at which the server is approaching, but has yet to attain, an unstable state. As such, server monitoring module 310 will generate and initiate communication of alerts when a server is determined to be approaching an unstable state (as evident by the monitoring indicating that a core parameter has reached or exceeded the threshold value).

Additionally, server monitoring optimizing module 320 is configured to optimize (i.e., adjust), over time, the threshold values based on changes in the conditions experienced by the plurality of servers (e.g., increase/decrease in server utilization and the like). The optimization that occurs is based on the historical and current server performance data, as well as, the relevant importance of each of the core parameters in comparison to the core parameter being considered for optimization/adjustment. In this regard, optimization entails evaluating the threshold value of a given core parameter (i.e., the core parameter being considered for evaluation) against one or more, in some instances all, other core parameters that impact the given core parameter. As such, the optimization of the threshold value of one core parameter is dependent upon the threshold values set of the other parameters.

Figure 2:
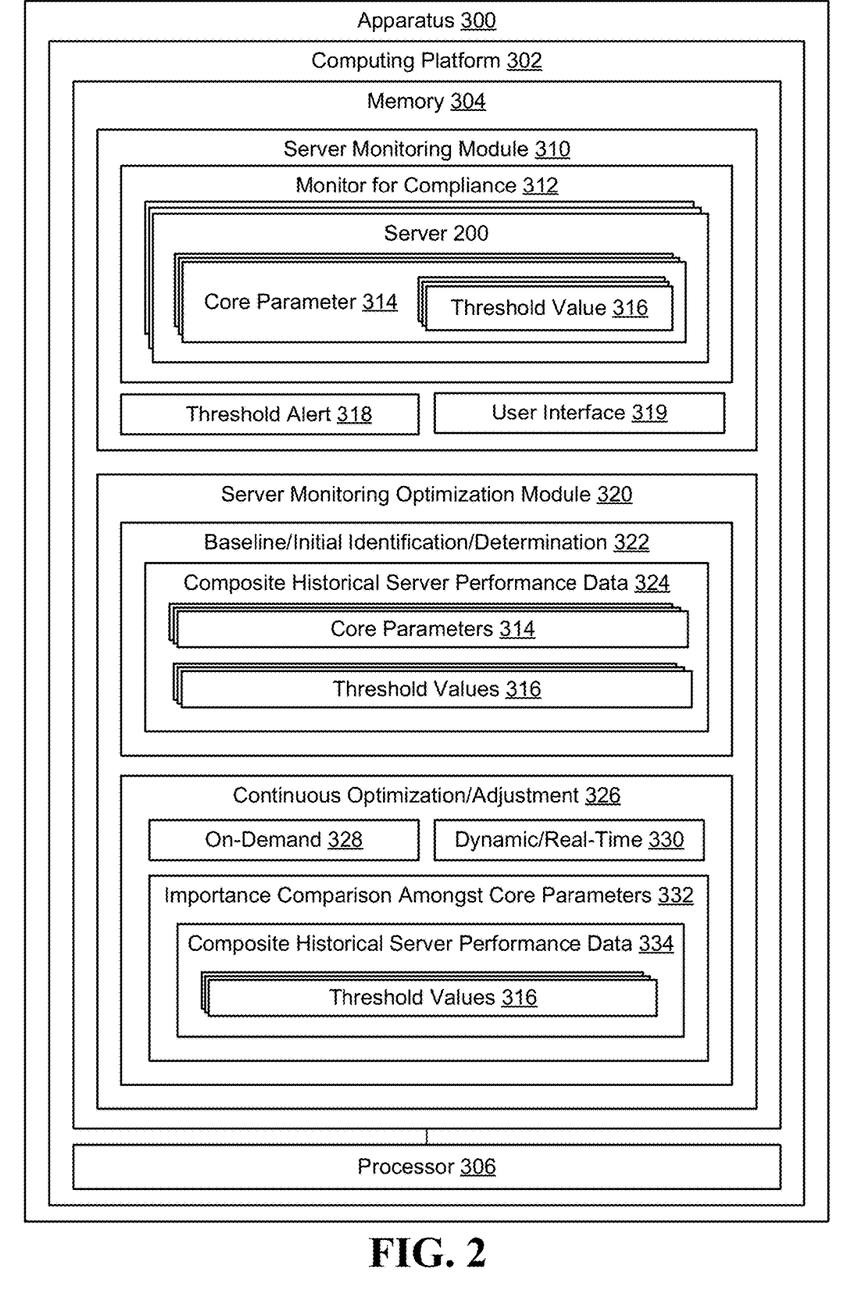
FIG. 2 provides a block diagram of an apparatus for dynamic optimization of servers in an enterprise environment, in accordance with embodiments of the present invention.

Referring to FIG. 2 shown is a block diagram of an apparatus 300 for optimizing monitoring of servers in an enterprise-wide server environment, in accordance with embodiments of the present invention. The apparatus 300 includes a computing platform 302 having a memory 304 and one or more processors 306 in communication with the memory 104. Moreover, the computing platform 302, may comprise multiple devices, such as multiple servers, databases and the like.

Memory 304 may comprise volatile and non-volatile memory, such as read-only and/or random-access memory (RAM), read-only memory ROM, EPROM, EEPROM, flash cards, or any memory common to computer platforms. Further, memory 304 may include one or more flash memory cells, or may be any secondary or tertiary storage device, such as magnetic media, optical media, tape, or soft or hard disk. Moreover, memory 304 may comprise cloud storage, such as provided by a cloud storage service and/or a cloud connection service.

Further, processor 306 may be an application-specific integrated circuit ("ASIC"), or other chipset, processor, logic circuit, or other data processing device. Processor 306 or other processor such as ASIC may execute an application programming interface ("API") (not shown in FIG. 2) that interfaces with any resident programs or modules, such as server monitoring module 310, server monitoring optimization module 320 and routines, sub-modules associated therewith or the like stored in the memory 304 of computing platform 302.

Processor 306 includes various processing subsystems (not shown in FIG. 2) embodied in hardware, firmware, software, and combinations thereof, that enable the functionality of apparatus 300 and the operability of the apparatus 300 on a network. For example, processing subsystems allow for initiating and maintaining communications and exchanging data with other networked computing platforms. For the disclosed aspects, processing subsystems of processor 306 may include any subsystem used in conjunction with server monitoring module 310, and/or server monitoring optimization module 320 and related algorithms, sub-algorithms, modules, sub-modules thereof.

Computer platform 306 may additionally include a communications module (not shown in FIG. 2) embodied in hardware, firmware, software, and combinations thereof, that enables communications among the various components of the computing platform 302, as well as between the other networked devices. Thus, communication module may include the requisite hardware, firmware, software and/or combinations thereof for establishing and maintaining a network communication connection.

Memory 304 of computing platform 302 stores server monitoring module 310, that is executable by processor 106 and configured to configured to monitor 312 a predetermined set of core parameters 314 on each of the plurality of servers 200 for compliance to an associated threshold value. In this regard, according to the present invention, the same core parameters are monitored on each of the plurality of servers 200 and the same threshold values are applied to those core parameters on each of the plurality of servers 200. Thus, in those embodiments in which the plurality of servers 200 is defined as most, if not all, of the servers in the enterprise computing network, the entirety of the servers will be monitored according to the same core parameters and the same threshold values. Such consistency of core parameters and threshold values provides for an objective and simplified approach to basic health monitoring of the entire server environment, which eliminates the subjectivity and complexity involved with individual server-responsible entities defining their own parameters and/or their own threshold values.

In the event that a threshold value is reached and/or exceeded during monitoring, the server monitoring module 310 is further configured to issue one or more alerts to predetermined entities within the enterprise as a means of notifying the entity of the non-compliance.

Moreover, server monitoring module 310 may include user interface 319 that is configured to provide a visual display to a user which is configured to display, in real-time, server monitoring data, including but not limited to core parameter monitoring results (e.g., for a process related core parameter, the number of process instances currently executing on a server of interest, and the number of processes instances that are currently in an error state as a result of the number of instances exceeding an allowable threshold value 316).

Memory 304 of apparatus 300 additionally stores server monitoring optimization module 320 that is executable by processor 306 and is configured to initially identify 322 the set of core parameters 314 that need to be monitored and determine 322 the initial baseline threshold values 316 for the identified core parameters 314. As previously discussed the core parameters and initial baseline threshold values are identified/determined based, at least, on composite historical server performance data 324, as well as, in some embodiments of the invention, heuristic models, enterprise requirements and any other data that may insure that the core parameter set and the initial baseline threshold values are initially optimal so as to identify problems that may be moving towards criticality in the server environment.

Additionally, server monitoring optimizing module 320 is configured to continuously optimize (i.e., adjust) 326, over time, the threshold values 316 based on changes in the conditions experienced by the plurality of servers (e.g., increase/decrease in CPU utilization, memory utilization and the like). The optimization/adjustment 326 may occur on-demand 328, such as on regularly scheduled basis (e.g., monthly, quarterly or the like) or at the bequest of the enterprise. In other embodiments of the invention, the optimization/adjustment 326 may occur dynamically, such as in-real-time, near real-time or the like, in response to current changes in the server environment. In such embodiments of the invention in which the optimization/adjustment is dynamically occurring, the present invention is able to insure that the threshold values reflect current, "live" conditions in the server environment.

As previously discussed, optimization/adjustment 216 is based on the relevant importance 332 of each of the core parameters in comparison to the core parameter being considered for optimization/adjustment, as well as, the historical and current server performance data 334. In this regard, the historical behavior of the overall server environment along with other historical events/incidents occurring within the server environment will be evaluated against each of the relevant core parameters 314 so as to match the historical behaviors and/or events/incidents to respective core parameters 314. Based on the behavioral evidences, including events/incidents, of the relevant core parameters 314, the threshold values may be optimized/adjusted 326. Furthermore, since the core parameters 314 may impact one or more other core 314 parameters, optimization/adjustment 326 of one threshold value 316 may result in optimization/adjustment 326 of other threshold values 316 associated with related/impacted core parameters 314.

In specific embodiment of the invention, optimization of threshold values 316 may include analyzing the sensitivity of existing thresholds in terms of tolerance and/or monitoring and analyzing real-time data and the rate at which the performance data hovers around (i.e., stays proximate to) the existing threshold value. Moreover, in response to optimizing/adjusting one or more threshold values, the present invention, may automatically validate the optimization adjustment to insure that the adjustment is within allowable limitations as defined by internal and/or external standards within the enterprise.

Figure 3:
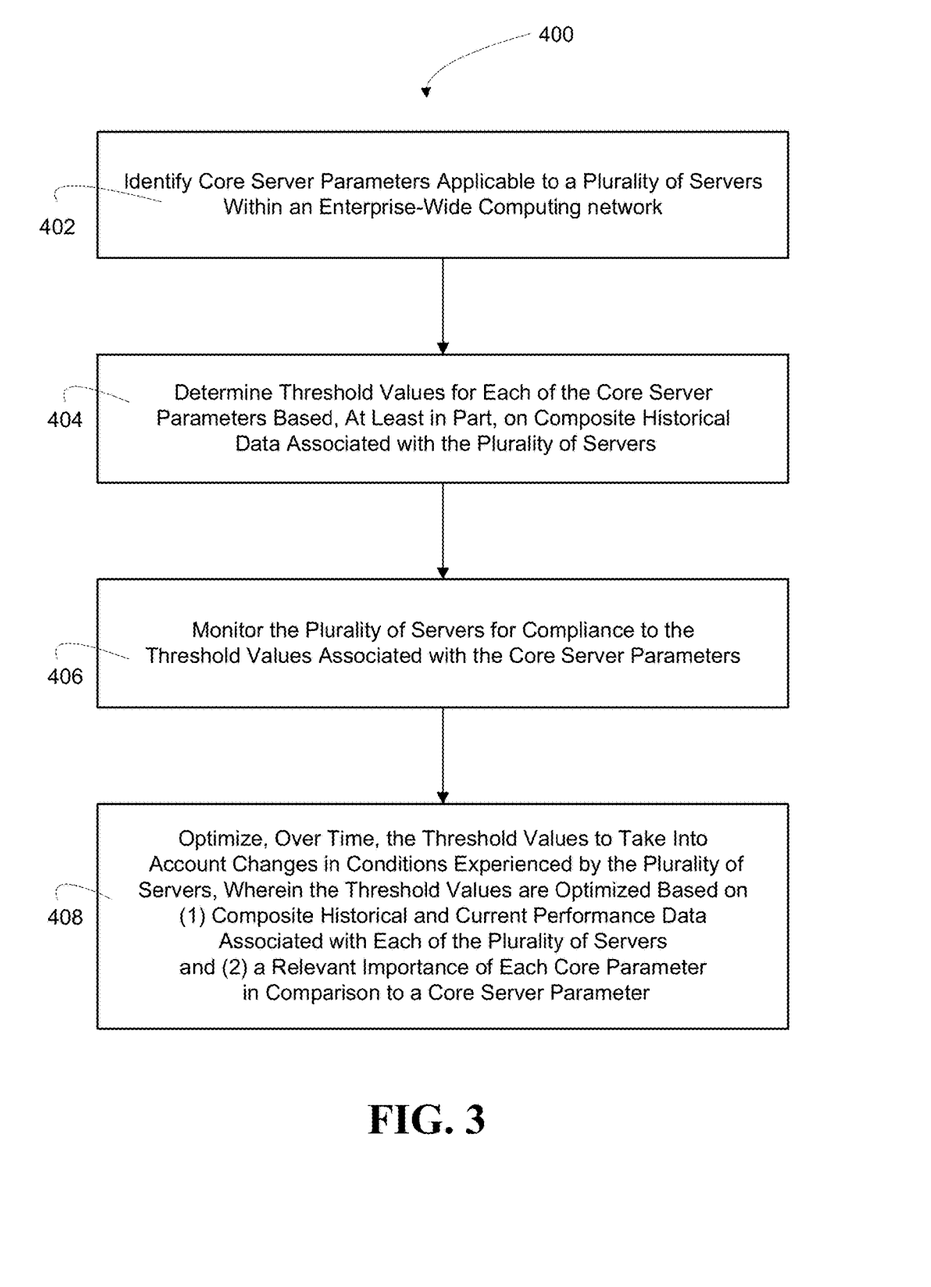
FIG. 3 provides a flow diagram of a method for dynamic optimization of servers in an enterprise environment, in accordance with embodiments of the present invention.

Referring to FIG. 3 a flow diagram is presented on a method 400 for optimization of server monitoring in an enterprise-wide server environment, in accordance with embodiments of the present invention. At Event 402, core server parameters applicable to a plurality of servers are identified. As previously noted, the plurality of servers may include most, if not all, of the servers in the enterprise-wide server environment. Moreover, the core parameters that are identified will vary from enterprise-to-enterprise depending on the needs and requirements of the enterprise. It should additionally be noted that reassessment of the core parameters (i.e., adding or deleting core parameters) may be required, over time, to insure that the core parameters are reflective of the needs/requirements of the enterprise and the current state of the server environment.

At Event 404, in response to identifying the core parameter set, the initial/baseline threshold values are determined using heuristic models that rely of the historical server performance data and any other relevant factors that insure that the threshold values are initially optimal (i.e., capable of identifying servers that are approaching, but have yet to attain, an unstable state).

At Event 406, initial monitoring of the plurality of servers ensues to insure compliance to the initial baseline threshold values associated with the identified core parameters. In the event, that monitoring determines that a threshold value of a core parameter has been reached and/or exceeded, one or more alerts are generated and communicated to predetermined entities (individual(s) or other computing systems) within the enterprise which server to notify the entities of the non-compliance and hasten any necessary manual or automated corrective actions.

At Event 408, the threshold values are optimized/adjusted, over time, to take into account changes in conditions experienced by the plurality of servers. The optimization of the present invention is based, at least in part, on composite historical and current performance of the plurality of servers (e.g., cumulative performance data of most, if not all, the servers in the enterprise-wide server environment) in conjunction with the relevant importance/impact of each core parameter on other core parameters. As such, the optimization of a given core parameter is proportional to the optimization of other parameter's that impact the given core parameter.

Thus, systems, apparatus, methods, and computer program products described above identifying the core server parameters to be monitored enterprise-wide and the baseline thresholds/limits for such parameters. The thresholds are dynamically optimized as the server environment evolves over time based on the composite historical performance of the servers in the enterprise. Moreover, each parameter's threshold is optimized in comparison to the thresholds of other core parameters that impact that specific parameter, such that such that each parameter's threshold is proportional to the importance to other parameter's that impact the specified core parameter. In the event that the monitoring results in a threshold being met or exceeded alerts may be generated to designated personnel and appropriate corrective action taken.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible.

Those skilled in the art may appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for optimizing monitoring of servers in an enterprise environment, the system comprising:
    a plurality of server devices operable throughout an enterprise environment;
    an apparatus including a computing platform having a memory and at least processor device in communication with the memory;
    a server monitoring module stored in the memory, executable by the processor device, and configured to:
        monitor a predetermined set of core server parameters on each of the plurality of servers for compliance to an associated threshold value, wherein the threshold value indicates a limit at which the server is approaching an unstable state, and
        in response to determining that one of the threshold values has been met or exceeded, generating and initiating communication of an alert;
    a server monitoring optimization module stored in computing memory, executable by a processor device that is in communication with the memory, and configured to:
    logically identify the core server parameters and corresponding threshold values for each of the core server parameters, wherein the threshold values are determined based at least in part on composite historical performance data associated with each of the plurality of servers; and
    optimize, over time while monitoring, the threshold values to take into account changes in conditions experienced by the plurality of servers, wherein the threshold values are optimized by:
        determining that a threshold value associated with one of the core parameters requires adjustment based on (1) composite historical performance data associated with each of the plurality of servers and (2) current performance associated with each of the plurality of servers, and
        in response to determining that the threshold value requires adjustment, proportionally adjusting at least one of other threshold values associated with other ones of the core parameters, wherein proportion of adjustment is based on a related impact that the one of the core parameters has on the other ones of the core parameters,
    wherein the core parameters include (i) central processing unit (CPU) usage percentage, (ii) memory usage percentage, (iii) disk space usage percentage and (iv) parameters related to processes hosted on the server.

2. The system of claim 1, wherein the server monitoring optimization module is further configured to optimize the threshold values on-demand.

3. The system of claim 1, wherein the server monitoring optimization module is further configured to optimize the threshold values on a continuous dynamic basis.

4. A computer-implemented method for optimizing monitoring of servers in an enterprise environment, the method comprising:
    identifying, by a computing device processor, core server parameters applicable to a plurality of servers within an enterprise-wide computing network;
    determining, by a computing device processor, threshold values for each of the core server parameters, wherein the threshold values indicate a limit at which the server is approaching an unstable state and are determined based at least in part on composite historical performance data associated with each of the plurality of servers;
    monitoring, by a computing device processor, the plurality of servers for compliance to the threshold values associated with the core server parameters;
    in response to determining that hat one of the threshold values has been met or exceeded, generating and initiating communication of an alert; and
    optimizing, by a computing device processor, over time while monitoring, the threshold values to take into account changes in conditions experienced by the plurality of servers, wherein the threshold values are optimized by:
        determining that a threshold value associated with one of the core parameters requires adjustment based on (1) composite historical performance data associated with each of the plurality of servers and (2) current performance associated with each of the plurality of servers, and
        in response to determining that the threshold value requires adjustment, proportionally adjusting at least one of other threshold values associated with other ones of the core parameters, wherein proportion of adjustment is based on a related impact that the one of the core parameters has on the other ones of the core parameters,
    wherein the core parameters include (i) central processing unit (CPU) usage percentage, (ii) memory usage percentage, (iii) disk space usage percentage and (iv) parameters related to processes hosted on the server.

5. The method of claim 4, wherein optimizing further comprises optimizing, by the computing device processor, on-demand, the threshold values.

6. The method of claim 4, wherein optimizing further comprises dynamically optimizing, by the computing device processor, over-time, the threshold values, such that the threshold values are continuously assessed to take into account real-time changes in conditions experienced by the plurality of servers.

7. A computer program product comprising:
a non-transitory computer-readable medium comprising:
a first set of codes for causing a computer to identify core server parameters applicable to a plurality of servers within an enterprise-wide computing network;
a second set of codes for causing a computer to determine threshold values for each of the core server parameters, wherein the threshold values indicate a limit at which the server is approaching an unstable state and are determined based at least in part on composite historical performance data associated with each of the plurality of servers;
a third set of codes for causing a computer to monitor the plurality of servers for compliance to the threshold values associated with the core server parameters, and, in response to determining that hat one of the threshold values has been met or exceeded, generating and initiating communication of an alert; and
a fourth set of codes for causing a computer to optimize, over time while monitoring, the threshold values to take into account changes in conditions experienced by the plurality of servers, wherein the threshold values are optimized by:
determining that a threshold value associated with one of the core parameters requires adjustment based on (1) composite historical performance data associated with each of the plurality of servers and (2) current performance associated with each of the plurality of servers, and
in response to determining that the threshold value requires adjustment, proportionally adjusting at least one of other threshold values associated with other ones of the core parameters, wherein proportion of adjustment is based on a related impact that the one of the core parameters has on the other ones of the core parameters,
wherein the core parameters include (i) central processing unit (CPU) usage percentage, (ii) memory usage percentage, (iii) disk space usage percentage and (iv) parameters related to processes hosted on the server.

8. The computer program product of claim 7, wherein the fourth set of codes is further configured to cause the computer to optimize, on-demand, the threshold values.

9. The computer program product of claim 7, wherein the fourth set of codes is further configured to cause the computer to dynamically optimize, over-time, the threshold values, such that the threshold values are continuously assessed to take into account real-time changes in conditions experienced by the plurality of servers.

10. The system of claim 1, wherein the core parameters further include (v) parameters related of logged data and (vi) parameters related to server hardware.

11. The computer-implemented method of claim 4, wherein the core parameters further include (v) parameters related of logged data and (vi) parameters related to server hardware.

12. The computer program product of claim 7, wherein the core parameters further include (v) parameters related of logged data and (vi) parameters related to server hardware.

13. The system of claim 1, wherein the parameters related to processes hosted on the server further include at least one parameter associated with (a) process availability and (b) process execution.

14. The computer-implemented method of claim 4, wherein the parameters related to processes hosted on the server further include at least one parameter associated with (a) process availability and (b) process execution.

15. The computer program product of claim 7, wherein the parameters related to processes hosted on the server further include at least one parameter associated with (a) process availability and (b) process execution.

* * * * *